United States Patent [19]

Iyer et al.

[11] Patent Number: 4,988,745

[45] Date of Patent: Jan. 29, 1991

[54] ESTER HARDENERS FOR PHENOLIC RESIN BINDER SYSTEMS

[75] Inventors: S. Raja Iyer, Naperville; Sudhir K. Trikha, Streamwood, both of Ill.

[73] Assignee: Acme Resin Corporation, Westchester, Ill.

[21] Appl. No.: 344,215

[22] Filed: Apr. 27, 1989

[51] Int. Cl.⁵ .......................... C08K 3/36; C08L 61/10
[52] U.S. Cl. .................................... 523/145; 524/541; 525/491
[58] Field of Search ...................... 523/145; 524/541; 525/491

[56] References Cited

U.S. PATENT DOCUMENTS

| | | |
|---|---|---|
| 3,485,797 | 12/1969 | Robins . |
| 4,246,157 | 1/1981 | Laitar . |
| 4,426,467 | 1/1984 | Quist et al. ........................ 523/145 |
| 4,474,904 | 10/1984 | Lemon et al. . |
| 4,546,124 | 10/1985 | Laitar et al. . |
| 4,657,950 | 4/1987 | Iyer et al. . |
| 4,740,535 | 4/1988 | Iyer et al. ........................ 523/145 |
| 4,789,693 | 12/1988 | Jhaveri et al. .................. 523/145 |

FOREIGN PATENT DOCUMENTS 62-282743  12/1987  Japan .

*Primary Examiner*—Lewis T. Jacobs
*Attorney, Agent, or Firm*—Rockey and Rifkin

[57] ABSTRACT

A hardener composition for alkaline phenolic resole resin binders which comprises a solution of a benzylic ether resole resin in an ester. Binder compositons comprising this hardener with alkaline phenolic resole resins are further provided as are foundry molding compositions and methods for making foundry cores and molds using the molding compositions.

21 Claims, No Drawings

ESTER HARDENERS FOR PHENOLIC RESIN BINDER SYSTEMS

FIELD OF THE INVENTION

This invention relates to alkaline phenolic resin binder systems which are cured by ester hardeners, moldable compositions which include the binders and aggregate material, and a process for making moldable compositions from them. More particularly, the invention relates to foundry binder compositions, moldable compositions including the same and aggregate material, and foundry cores or molds made therefrom, including a process for their manufacture.

BACKGROUND OF THE INVENTION

Binders or binder systems for foundry cores and molds are well-known. In the foundry art, cores or molds for making metal castings are normally prepared from a mixture of an aggregate material, such as sand, and a binding amount of a binder or binder system. Typically, after the aggregate material and binder have been mixed, the resulting mixture is rammed, blown or otherwise formed to the desired shape or pattern, and then cured with the use of catalysts and/or heat to a solid, cured state.

Resin binders used in the production of foundry molds and cores are often cured at high temperatures to achieve the fast-curing cycles required in foundries. However, in recent years, resin binders have been developed which cure at low temperatures. These processes are preferred over high-temperature curing operations which have higher energy requirements and which often result in the production of undesirable fumes.

One group of processes which do not require heating in order to achieve curing of the resin binder are referred to as no-bake processes. In such processes, the binder components are coated on the aggregate material, such as sand, and the resulting mixture is rammed, blown or otherwise formed to the desired shape or pattern. Curing of the binder is achieved without heating.

One such no bake process employs an aqueous alkaline solution of a phenolic resole resin as the binder. In this process, the foundry sand is usually mixed with an ester hardener before the solution of resole resin is added to the mixture. The process is described in detail in U.S. Pat. No. 4,474,904 (Re No. 32 812) which is incorporated herein by reference in its entirety.

The ester cured process is superior to some of the earlier processes from an environmental standpoint. However, the initial tensile strengths of the cores made by this process tend to be somewhat lower than those prepared by other no bake processes.

In Japanese Patent Application No. 62-282743 the absolute amount of binder addition was increased, resulting in higher tensile strengths of ester cured resins. This was achieved by using a solution of a phenolformaldehyde resin in the organic ester as the hardening agent. Examples of both novolak and resole resins in the ester solution were given. However, this approach has its limitations. The novolak resins used dissolve only in gamabutyrolactone and are not soluble in other ester hardeners which are useful in many applications in alkaline phenolic resin binders. The resoles disclosed do not form stable solutions in a number of the ester hardeners.

We have now discovered that solutions of benzylic ether phenolic resole resins in ester solvents are excellent hardeners for use in the ester cured process. Higher initial tensile strengths of cores made using this binder system are achieved without increasing the absolute amount of binder addition. Furthermore, the benzylic ether phenolic resole resins form stable solutions in triacetin (glycerol triacetate), ethylene glycol diacetate and other ester hardeners in which ordinary resole resins are not stable.

SUMMARY OF THE INVENTION

In accordance with this invention, there is provided a hardener composition for alkaline phenolic resole resin binders which comprises a solution of benzylic ether resole resin in an ester, said benzylic ether resole resin comprising from about 5 percent to about 40 percent by weight of the solution.

Further provided, in accordance with this invention, is a binder composition which comprises an aqueous alkaline solution of a phenolic resole resin and a hardener for said phenolic resole resin wherein the hardener comprises a solution of a benzylic ether resole resin in an ester, said benzylic ether resole resin comprising from about 5 percent to about 40 percent by weight of the hardener.

Also provided, in accordance with this invention, is a foundry molding composition which comprises a mixture of particulate refractory material such as sand with the binder composition of this invention, as well as a method for making foundry cores and molds using the foundry molding composition.

DETAILED DESCRIPTION OF THE INVENTION

The benzylic ether resole resins used in the practice of this invention are prepared by the reaction of a phenol with a molar excess of an aldehyde in the presence of a divalent metal ion catalyst. The preparation of such resins is well-known and has been described, for example, in U.S. Pat. No. 3,485,797. The phenols employed in the formation of the phenolic resin are generally any of the monohydric phenols which are used to prepare phenolic resins. Exemplary phenols include phenol itself and the cresols. A particularly useful phenol is ortho-cresol. The preparation of benzylic ether resole resins from the commercially available 80 percent ortho-cresol is described in detail in U.S. Pat. No. 4,246,157.

The aldehyde employed in the formation of the benzylic ether resole resins may also vary widely. Suitable aldehydes include any of the aldehydes heretofore employed in formation of phenolic resole resins, such as formaldehyde, acetaldehyde, propionaldehyde, furfuraldehyde, and benzaldehyde. In general, the aldehydes employed have the formula RCHO, where R is a hydrogen or a hydrocarbon radical of one to eight carbon atoms. The most preferred aldehyde is formaldehyde.

The molar ratio of aldehyde to phenol used to make the benzylic ether resole resins of this invention is from about 1.1: to about 2.5:1. It is preferable that the molar ratio of aldehyde to phenol be in the range from about 1.2:1 to about 2.2:1.

Alkoxy modified benzylic ether resole resins are particularly useful in the process of this invention. The preparation of such compounds is well-known and is described, for example, in U.S. Pat. Nos. 4,546,124 and 4,657,950. These resins are prepared by etherifying at least part of the methylol groups of the resin with a lower aliphatic alcohol having from 1 to about 4 carbon atoms. They have alkoxymethylene groups attached to the benzene rings. The groups have the general formula —$(CH_2O)_nR$ where R is the alkyl group of the alcohol used, and n is a small positive integer. These groups are substituants at the positions ortho and para to the phenolic hydroxyl groups in the resin.

The esters used in preparing the hardener compositions of this invention may be any of the esters commonly used to cure alkaline phenolic resole resins. Such esters include gamma-butyrolactone, triacetin, ethylene glycol diacetate, propyleneglycol diacetate, propylene carbonate, dimethyl succinate, dimethyl adipate, dimethyl glutarate, glycerol mono-and diacetates and the like. Mixtures of these esters may also be used.

As noted above, the hardener compositions of this invention comprise a solution of the benzylic ether resole resin in the ester. The resole resins comprise from about 5 percent to about 40 percent, preferably from about 15 percent to about 30 percent by weight of the solution.

The hardeners of this invention are used to cure alkaline solutions of phenolic resole resin binders. Such binders have a molar ratio of alkali to phenol in the range of from about 0.2:1 to about 1.2:1. The preferred molar range of alkali to phenol is from about 0.4:1 to about 0.9:1. The alkali used in such resins is usually KOH, NaOH, or mixtures thereof, although other alkalis are not excluded. The solutions of the resin binders are aqueous solutions with a solid content preferably in the range of from about 40 percent to about 75 percent by weight.

The binders which employ the hardeners of this invention are useful for preparing foundry molding compositions. Such compositions comprise a granular refractory material and from about 0.5 percent to about 8 percent by weight of the refractory material of the aqueous alkaline binder solution. The granular refractory materials used in the molding composition may be any of the refractory materials employed in the foundry industry for the production of molds and cores, such as silica sand, chromite sand, zircon sand or olivine sand and mixtures thereof. When such sands are used, it is preferred that the binder solution be present in an amount from about 1 percent to about 3 percent by weight of the sand.

Other commonly employed additives such as urea and organosilanes can be optionally used in the binder compositions of this invention. The organosilanes, which are known as coupling agents, enhance the adhesion of the binder to the sand. Examples of useful coupling agents of this type include amino silanes, epoxy silanes, mercapto silanes, hydroxy silanes, and ureido silanes.

When the binders of this invention are used for the production of foundry cores and molds, the refractory material such as foundry sand, is mixed thoroughly with the ester hardener containing the benzylic ether resole resin. To this mixture is then added the alkaline phenolic resole resin binder solution. Mixing is carried out until substantially all of the sand particles are coated completely and uniformly with the binder solution. Alternatively, the resin binder solution may be first mixed with the sand followed by addition of the ester hardener to the mixture, or the binder solution and the ester may be added simultaneously. In any case, the refractory material coated with the binder and hardener is then placed in a core or mold box. The mixture is allowed to cure at ambient temperature.

The following specific examples illustrate the present invention. They are not intended to limit the invention in any way. Unless otherwise indicated, all parts and percentages are by weight.

EXAMPLE I

A benzylic ether resole resin was prepared by mixing 34.21 parts of 80 percent ortho-cresol and 9.09 parts of phenol in a flask fitted with a stirrer and condenser. Then 32.0 parts of 50 percent formaldehyde- solution, 2.07 parts of 25 percent aqueous zinc acetate solution and 0.177 parts of CaO were added. The contents were heated under reflux with stirring until the free formaldehyde content of the solution was less than 3% by weight. Then 0.354 parts of 50 percent aqueous citric acid was added before water was removed under vacuum. The mixture was then heated at 90° C. for about two hours and cooled. The ester hardener solution was prepared by dissolving 20 parts of the resin in 80 parts of gamma-butyrolactone.

The phenolic resin for the binder was prepared as follows: A mixture of 610 g of phenol, 820 g of 50 percent formaldehyde and 44 g of 55 percent KOH solution was heated under reflux until the viscosity of the solution at 25° C. was 430–470cps. The batch was cooled to room temperature and 500 g of 55 percent KOH solution was added. Finally, 0.39 percent by weight of the resin of gamma-aminopropyltriethoxysilane was added and mixed in thoroughly. The resulting resin had a viscosity of 155 cps at 25° C., a formaldehyde to phenol molar ratio of 2:1 and a KOH:phenol ratio of 0.82:1.

Test cores were prepared by the following method: to a quantity of about 2.5 kg washed and dried silica sand was added 1.44 percent of the phenolic binder solution and the mixture was stirred for one minute in a Hobart Kitchen Aid Mixer. Then, 31.1 percent by weight of the resin of the ester hardener solution containing the benzylic ether resole resin in gamma-butyrolactone was added. This mixture was stirred for an additional 30 seconds and then used immediately to form standard American Foundrymen Society's 1-inch dog bone tensile specimens in a Dietert 696 core box. The cores were cured at room temperature and the samples were broken at various time intervals after the mix was made. Tensile strength measurements were made using a Dietert Universal Sand Strength Machine 400-1 fitted with a tensile core strength accessory 610-N. Average values for 3 to 4 tensile strength measurements were recorded A comparative test was performed using 1.5 percent of the resin based on the sand and 25 percent by weight of the resin of gamma-butyrolactone hardener. These proportions were used to give the same total amount of resin on the sand as that used in the foregoing test. The results given in Table 1 show that the cores made using the ester hardener composition of this invention give much higher initial tensile strengths than those using the conventional hardener, gamma-butyrolactone.

TABLE 1

Tensile Strength of Test Cores Using Alkaline Phenolic Resole Resin Binders Cured With Ester Hardeners

| Hardener | Tensile Strength (psi) | | |
|---|---|---|---|
| | 30 min. | 1 hr. | 24 hr. |
| 20% Benzylic Ether Resin 80% Gamma-Butyrolactone | 120 | 151 | 203 |
| Gamma-Butyrolactone (Comparative Test) | 99 | 113 | 151 |

EXAMPLE II

A methoxy-modified benzylic ether resin was prepared by the following process: a mixture of 38.31 parts of phenol, 39.61 parts of formaldehyde, 10.87 parts of methanol and 3.2 parts of 25 percent aqueous zinc acetate solution was stirred under reflux until the free formaldehyde content was less than 3 percent. Then, 0.4 parts of citric acid was added and the mixture was dehydrated under vacuum. The temperature was then raised and the mixture was held at 90° C. for one hour. Twenty parts of the resin was mixed with 80 parts of gamma-butyrolactone to form an ester hardener solution. This hardener solution was used to cure sand cores coated with a phenolic resole resin using the same procedure and proportions as used in Example I. Test cores prepared in this manner showed average tensile strengths of 120 psi, 140 psi, and 167 psi after 1, 2 and 24 hours after the mix was made. These results demonstrate the superior tensile strength of cores made using a hardener containing an alkoxy-modified a benzylic ether resole resin.

EXAMPLE III

A benzylic ether resole resin was prepared from unsubstituted phenol as follows: a mixture of 1100 g of phenol, 950 g of 50 percent aqueous formaldehyde and 58.7 g of 25 percent aqueous zinc acetate solution was heated with stirring under reflux until the free formaldehyde content of the solution was less than 3 percent. Then, 10 g of 50 percent aqueous citric acid solution was added, the mixture was cooled to 50° C. and dehydrated under vacuum. The mixture was then heated for two hours at 92° C. under vacuum.

A solution of 20 parts of the resin in 80 parts of gamma-butyrolactone was used to cure sand cores coated with phenolic resole resin using the same procedure and proportions as used in Example I. Test cores prepared in this manner showed average tensile strengths of 125 psi, 136 psi, 174 psi and 186 psi after 1, 2, 4 and 24 hours, respectively. This again shows the superior tensile strength of cores made using a hardener containing a benzylic ether resole resin.

EXAMPLE IV

A comparative test was made using the modified ester hardener of Japanese Patent Application No. 62/282743. This hardener contained a phenolic resin prepared as follows: a mixture of 767 g of phenol, 59 g of 41.5 percent aqueous formaldehyde solution and 4.1 g of oxylic acid was heated with stirring to 85° C. then 413 g of 41.5 percent aqueous formaldehyde solution was added slowly over a 30-minute period while the mixture refluxed. The mixture was refluxed with stirring for an additional two hours before the batch was dehydrated by heating under vacuum to a temperature of 150° C. Thirty-five parts of the cooled resin was dissolved in 65 parts of gamma-butyrolactone to produce a hardener.

An alkaline solution of a phenolic resole resin was prepared in accord with the disclosure of the Japanese patent application. This involved the reaction of 168 g of phenol, 323 g of 41.5 percent aqueous formaldehyde and 209 g of 48 percent aqueous KOH solution at 85° C. for five hours. The solution was dehydrated to a water content of 45.6 percent giving a resin solution with a viscosity of 122 cps at 25° C. To the solution was added 0.4 percent by weight of gamma-aminopropyltriethoxysilane. Test sand cores were prepared following the general procedure given in Example I using 1.38 percent of resin by weight of the sand and 38.2 percent of the hardener solution by weight of the resin.

The tests were repeated using sand coated with 1.38 percent by weight of the phenolic resin and 38.2 percent by weight of the resin of a hardener containing 35 percent of the benzylic ether resole resin described in Example I and 65 percent of gamma-butyrolactone. The results given in Table 2 show that the hardener containing the benzylic ether resole resin of this invention produces cores with distinctly higher tensile strengths than those produced with the modified hardener described in Japanese Patent Application No. 62/282743.

Similar tests were run in which the ester hardener was a mixture of 20 parts of resin, 20 parts of gamma-butyrolactone and parts of triacetin. The results given in Table 2 also indicate the superiority of ester hardeners containing a benzylic ether resin.

TABLE 2

Comparison of Modified Ester Hardener With Modified Hardener of Prior Art

| Hardener | | Tensile Strenth (psi) | | |
|---|---|---|---|---|
| | | 1 hr. | 2 hr. | 24 hr. |
| 35% Benzylic Ether Resin 65% Gamma-Butyrolactone | | 118 | 140 | 170 |
| 35% Novolak Resin 65% Gamma-Butyrolactone | (Comparative Test) | 104 | 134 | 158 |
| 20% Benzylic Ether Resin 20% Gamma-Butyrolactone 60% Triacetin | | 62 | 104 | 191 |
| 20% Novolak Resin 20% Gamma-Butyrolactone 60% Triacetin | (Comparative Test) | 61 | 91 | 159 |

EXAMPLE V

The benzylic ether resole resins of Examples I and III were dissolved in the ester triacetin to give another example of an ester hardener. This hardener solution contained 20 percent of the benzylic ether resins. The alkaline solution of the phenolic resin binder contained a higher ratio of KOH:phenol than the one used in Example I. This was prepared by mixing 95.6 parts of the resin binder of Example I with 4.4 parts of 60 percent KOH solution. Sand cores were prepared in which sand was coated with 1.44 percent by weight of this resin and 31.1 percent based on the weight of the resin of the triacetin hardeners containing the benzylic ether resins of Examples I and III. A comparative test was run using 1.5 percent by weight of the phenolic binder on the sand and 25 percent by weight of the resin of triacetin hardener alone. The results given in Table 3 demonstrate that sand cores prepared using an alkaline phenolic resole binder cured with the hardeners of this invention have superior tensile strength over those cured using the conventional ester hardener, triacetin.

TABLE 3

Tensile Strength of Test Cores Using Alkaline Phenolic Resole Resin Binders Cured With Ester Hardeners

| Hardener | Tensile Strength (psi) | | |
|---|---|---|---|
| | 2 hr. | 4 hr. | 24 hr. |
| 20% Benzylic Ester Resin of Example I 80% Triacetin | 97 | 154 | 200 |
| 20% Benzylic Ester Resin of Example III 80% Triacetin | 134 | 190 | 213 |
| Triacetin (Comparative Test) | 78 | 129 | 174 |

Thus, it is apparent that there has been provided, in accordance with this invention, improved ester hardeners for alkaline phenolic resole resin binder systems and foundry binder compositions containing these hardeners that fully satisfy the objects, aims and advantages set forth above. While the invention has been described in conjunction with specific embodiments thereof, it is evident that many alternatives, modifications and variations will be apparent to those skilled in the art in light of the foregoing description. Accordingly it is intended to include all such alternatives, modifications and variations as set forth within the spirit and broad scope of the appended claims.

What is claimed is:

1. A hardener composition for alkaline phenolic resole resin binders which comprises a solution of a benzylic ether resole resin in an ester, said benzylic ether resole resin comprising from about 5 percent to about 40 percent by weight of the solution.

2. The hardener composition of claim 1 wherein the phenol used for the preparation of the benzylic ether resole resin is selected from the group consisting of phenol, ortho-cresol, and mixtures thereof.

3. The hardener of claim 1 wherein the benzylic ether resole resin is an alkoxy-modified benzylic ether resole resin.

4. The benzylic ether resole resin of claim 3 wherein the alkoxy-modified benzylic ether resole resin is a methoxy-modified benzylic ether resole resin.

5. The hardener composition of claim 1 wherein the ester is selected from the group consisting of gamma-butyrolactone, triacetin, and mixtures thereof.

6. The hardener composition of claim 1 wherein the benzylic ether resole resin comprises from about 15 percent to about 30 percent by weight of the solution.

7. A binder composition which comprises an aqueous alkaline solution of a phenolic resole resin and a hardener for said phenolic resole resin wherein the hardener comprises a solution of a benzylic ether resole resin in an ester, said benzylic ether resole resin comprising from about 5 percent to about 40 percent by weight of the hardener.

8. The binder composition of claim 7 wherein the phenol used for the preparation of the benzylic ether resole resin is selected from the group consisting of phenol, ortho-cresol, and mixtures thereof.

9. The binder composition of claim 7 wherein the benzylic ether resole resin is an alkoxy-modified benzylic ether resole resin.

10. The binder composition of claim 9 wherein the alkoxy-modified phenolic benzylic ether resole resin is a methoxy-modified benzylic ether resole resin.

11. The binder composition of claim 7 wherein the ester is selected from the group consisting of gamma-butyrolactone, triacetin, and mixtures thereof.

12. The binder composition of claim 7 which further comprises a silane.

13. The binder composition of claim 7 wherein the benzylic ether resole resin comprises from about 15 percent to about 30 percent by weight of the hardener.

14. A foundry molding composition which comprises granular refractory material, and the binder composition of claim 7.

15. The foundry molding composition of claim 14 wherein phenol used for the preparation of the benzylic ether resole resin is selected from the group consisting of phenol, ortho-cresol, and mixtures thereof.

16. The foundry molding composition of claim 14 wherein the benzylic ether resole resin is an alkoxy-modified benzylic ether resole resin.

17. The foundry molding composition of claim 16 wherein the alkoxy-modified benzylic ether resole resin is a methoxy-modified benzylic ether resole resin.

18. The foundry molding composition of claim 14 wherein the ester is selected from the group consisting of gamma-butyrolactone, triacetin, and mixtures thereof.

19. The foundry molding composition of claim 14 wherein the binder composition comprises from about 0.5 percent to about 8 percent by weight of the molding composition.

20. The foundry molding composition of claim 14 wherein the binder composition further comprises a silane.

21. The foundry molding composition of claim 14 wherein the benzylic ether resole resin comprises from about 15 percent to about 30 percent by weight of the hardener.

* * * * *